March 14, 1961
I. K. DORTORT
2,975,355
BY-PASS CIRCUIT FOR CONTACT CONVERTERS
Filed March 20, 1958
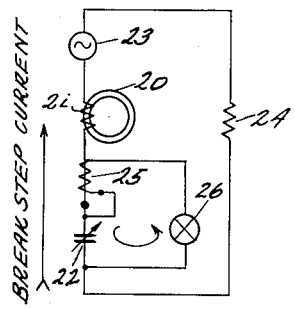
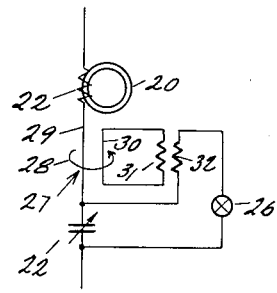
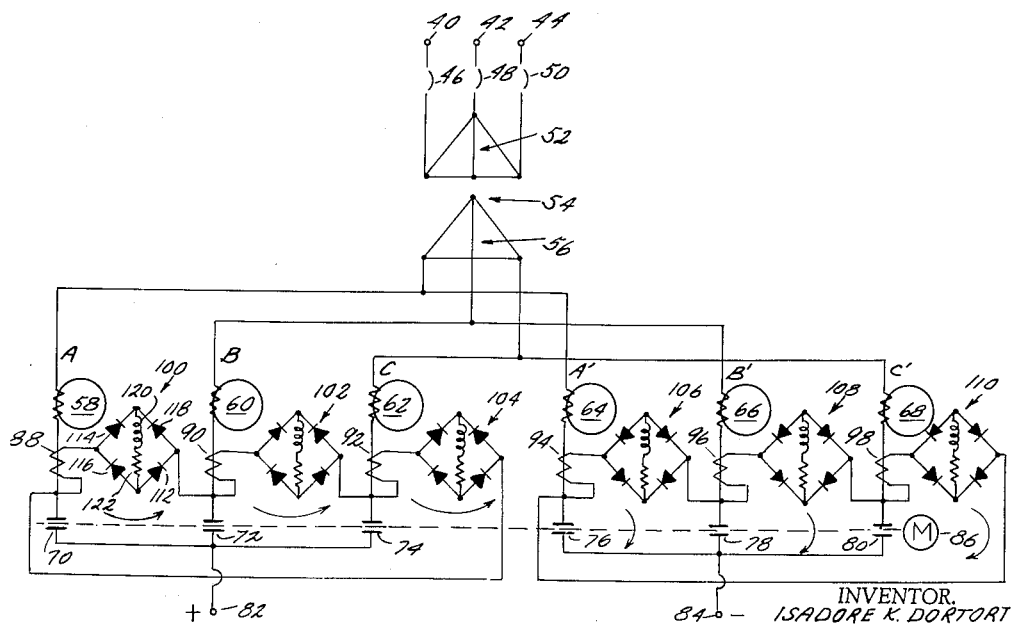
INVENTOR.
ISADORE K. DORTORT
BY
ATTORNEYS

United States Patent Office 2,975,355
Patented Mar. 14, 1961

2,975,355
BY-PASS CIRCUIT FOR CONTACT CONVERTERS

Isadore K. Dortort, Philadelphia, Pa., assignor to I-T-E Circuit Breaker Company, Philadelphia, Pa., a corporation of Pennsylvania Filed Mar. 20, 1958, Ser. No. 722,760

8 Claims. (Cl. 321—48)

My invention relates to an improvement of my copending application Serial No. 587,122 filed May 24, 1956, now U.S. Patent No. 2,883,603, entitled Cancellation of Break Step Current for Contact Converters and assigned to the assignee of the instant invention, and more specifically relates to a novel current control means for a by-pass circuit.

My above noted copending application Serial No. 587,122, now U.S. Patent No. 2,883,603, describes a by-pass circuit for contact converters such as mechanical rectifiers wherein a low current step is provided for the contacts by a commutating reactor so that the contacts may be separated during the low current interval. However, as described in copending application Serial No. 587,122, now U.S. Patent No. 2,883,603, the current magnitude of the relatively low current step, is sufficient to cause contact damage after an extended period of operation.

Thus, the above noted application proposes a by-pass circuit in which a current transformer connected in series with the contact measures the actual magnetizing current flowing through the commutating reactor during the break interval. A current equal to the measured current is then sent back through the contact in an opposite direction so as to substantially cancel the magnetizing current flow through the contact whereby the contact may be opened under substantially zero current conditions.

In addition to the current transformer in the measuring system, it is also necessary to provide a current limiting means which will offer a substantially zero impedance to currents below some predetermined magnitude and within the magnitude of the magnetizing current, while still offering a substantially high impedance to current magnitudes above this predetermined magnitude.

To this end, an auxiliary rectifier system such as a bridge-connected rectifier type circuit having an inductance connected across its D.-C. output, has had its A.-C. terminals connected in series with the current transformer. This circuit operates to conduct a current in one direction through the choke connected at its D.-C. terminals so that during periods in which voltage is not connected across the bridge, the choke causes a circulating current to flow in the forward direction through the diodes of the bridge. When it is now necessary to have the compensating current flow in the compensating circuit, because of step current measurement at the current transformer, then the compensating current builds up in a direction to buck current through a conducting pair of diodes so that the compensating current can rise in a circuit containing substantially zero impedance. When, however, the full forward current driven through the diodes by the choke is bucked down, then a further increase in the compensating current would mean a reversal of current through the diodes so that the diodes at this point assume their normal high inverse impedance.

While this type of circuit is extremely simple, the requirements of the choke are substantial, since the choke must continue to drive a current through the diodes for a relatively long time. That is to say, the choke must discharge during the time its associated contact is closed so that a forward current will be established in the above noted pair of diodes for subsequent operation of the compensating current.

I have found that for multi-phase converter systems, the series combination of current transformer and current control means may be connected in series with two adjacent phase contacts whereby the phase voltage maintains the choke charged during all times but the time that the contacts overlap. Thus, instead of having to maintain current through the diodes for an appreciable part of a cycle, the choke will now need to drive the current through the diodes only for the relatively short fraction of a cycle during which the next contact to close overlaps with the contact to be opened and to be compensated. Therefore, the size of the choke can be substantially decreased.

Accordingly, the primary object of my invention is to provide a novel by-pass circuit for contact converters.

Another object of my invention is to provide a novel current control means for the by-pass circuit of contact converters in which the size of the choke is substantially decreased.

Another object of my invention is to provide a novel current control means for mechanical rectifier by-pass circuits wherein the current control means and current sensing means are connected in series with both the contact to be compensated and the next contact to be closed.

These and other objects of my invention will become apparent from the following description when taken in connection with the drawings, in which:

Figure 1 shows a circuit diagram illustrating the principle of contact converter by-pass circuits.

Figure 2 shows a modification of the circuit of Figure 1.

Figure 3 illustrates my novel invention in conjunction with a six-phase mechanical rectifier.

The principle of by-pass circuits of the type to which my novel invention applies is fully set forth in my above noted copending application Serial No. 587,122, now U.S. Patent No. 2,883,603, and two embodiments of typical by-pass circuits are set forth in Figures 1 and 2 respectively.

Referring first to Figure 1, a commutating reactor core 20 is shown as having a winding 21 connected in series with a contact 22. Contact 22 is mechanically driven into and out of engagement in synchronism with the A.-C. source 23 so as to deliver an average voltage to the D.-C. load 24.

As may be seen with reference to Patent No. 2,693,569 to Diebold, as the load current 24 decreases through a zero value, the commutating reactor 20 will unsaturate to thereby provide a low current step within which the contact 22 may be opened.

So that this contact may interrupt a substantially zero current, I provide a current transformer having a secondary winding 25 to measure the magnetizing current of the commutating reactor 20 and to thereafter impress this secondary output current across the contact 22 in series with a current limiting means 26. The current transformer having secondary winding 25 is more specifically a current transformer which could have a one-to-one turns ratio so that it will induce a current, as shown by the arrow, which is of the same shape and magnitude as the magnetizing current of commutating reactor winding 21, to flow through the contact 22 in a direction opposite to the magnetizing current. Hence complete cancellation of the current through contact 22 may be obtained.

The current limiting valve 26 is required in the circuit since, after contact 22 opens, the reverse voltage appearing thereacross will be impressed across current limiting valve 26. Hence valve 26 must be provided with the property of opposing current flow therethrough when the contact 22 is opened while still providing a substantially zero impedance circuit for current flow of smaller value in the same direction during the break-step.

Figure 2 shows a second embodiment of my novel invention wherein a current transformer seen generally at 27 is comprised of a core 28, a primary winding 29, and a secondary winding 30. An auxiliary current transformer is then provided comprising the primary winding 31 and the secondary winding 32, the secondary winding 32 supplying the compensating current for the contact 22.

It may be desirable that a system such as that seen in Figure 2 be utilized wherein the turns ratio of the current transformer is not the exact one-to-one turns ratio described in conjunction with Figure 1, but a turns ratio which is so adjusted as to have an output current from secondary winding 32 which is of a slightly greater magnitude than the primary current through winding 29. This may be desirable in order to assure that a very slight positive current flows through the contact 22 prior to the break step so that in the event of an arc during contact disengagement, the arc will be extinguished upon a subsequent passage through zero current.

A turns ratio which is slightly different from an exact one-to-one ratio would in a practical case be difficult to obtain when utilizing a single current transformer as shown in Figure 1 in view of the relatively high currents conducted in mechanical rectifier or contact converter devices. That is to say, the number of turns of the primary and secondary windings will be substantially limited. Therefore, in Figure 2, a first current transformer 29 which may be a one-to-one ratio current transformer may cause energization of winding 31 of an auxiliary current transformer, which winding may have a relatively high number of turns. Hence, winding 32 may have a number of turns only slightly different from the number of turns of winding 31 to thereby effect a turns ratio slightly less than one-to-one between the primary winding 29 of the first current transformer and the secondary winding 32 of the auxiliary current transformer. Thus the output current of secondary winding 32 may be slightly greater than the magnetizing current of the commutating reactor 20, which flows in current transformer primary winding 29, and the net current through contact 22 will always be a very small positive value.

It is to be understood that, in order to have an exact or substantially exact reproduction of the wave shape of the magnetizing current for the output of the compensating circuit, the current transformer utilized must be highly linear in the period during which step current flows.

Figure 3 specifically shows my novel current control means or valve means and the connection therefor in accordance with the instant invention. The embodiment of Figure 3 is a six-phase mechanical rectifier which is energized at its input terminals 40, 42 and 44 by a three-phase source with terminals 40 through 44 being connectable through A.-C. circuit breakers 46, 48 and 50 to the primary winding 52 of rectifier transformer 54. The secondary winding 56 of rectifier transformer 54 is then connected to three positive phases, A, B and C, and three negative phases A', B' and C'.

Each of the phases has a respective commutating reactor 58, 60, 62, 64, 66 and 68 connected in series with a respective contact 70, 72, 74, 76, 78 and 80. The D.-C. side of each of contacts 70, 72 and 74 are then connected to a common output positive bus terminated by positive terminal 82. In a similar manner, the D.-C. side of each of contacts 76, 78 and 80 are connected together in a negative bus and brought out to the negative terminal 84.

Contacts 70 through 80 are driven between their engaged and disengaged positions so as to selectively connect the secondary winding 56 of the A.-C. side of the rectifier to the D.-C. terminals 82 and 84 by means of a synchronous motor 86 which is operatively connected to each of the contacts.

The sequence in which the contacts are driven follows the phase sequence of the A.-C. source. By way of example, for the positive contacts, the closing sequence will be contact 70, contact 72, and contact 74 where the contacts close 120° after the preceding contact and the contacts normally remain closed for 120° or more.

A similar phase rotation is associated with contacts 76, 78 and 80 where contacts 76, 78 and 80 operate 180° after contacts 70, 72 and 74 respectively.

Each of contacts 70 through 80 has a compensating circuit of the by-pass type associated therewith which includes a current measuring means, such as current transformers 88, 90, 92, 94, 96 and 98 respectively. It is to be noted that current transformers 88 through 98 are of the type set forth above in Figure 1.

A current control means or valve means 100, 102, 104, 106, 108 and 110 respectively are then connected in series with their respective current measuring means, the current control means 100 through 110 performing the operation described above in Figures 1 and 2 for the valve means 26. However, in accordance with the instant invention, both terminals of the by-pass circuit current control means 100 through 110 of Figure 3 are connected from their respective current transformer and to the A.-C. side of the next contact to be operated.

Each of the control means is comprised of a first pair of rectifier elements 112 and 114, and a second pair of rectifier elements 116 and 118 which are connected in a bridge type circuit. The D.C. terminals of the bridge connected rectifiers 112 through 118 are connected in series with a choke 120 and a current limiting resistor 122, while the A.-C. terminals of the bridge are connected in the by-pass circuit.

The operation of the compensating means of Figure 3 may now be understood, it being assumed that contact 70 is closed and is to be opened and compensated during the break step, while the contact 72 is open and is to be closed. Before contact 72 is closed, the voltage appearing between phases A and B will drive a current around the circuit including commutating reactor 60, diode 118, choke 120, resistor 122, diode 116, current transformer secondary winding 88 and commutating reactor 58. Thus, the normal flow of current through choke 120 is in a downward direction.

It is to be noted that choke 120 is charged, or has a voltage applied thereacross, even through the contact 70 is closed, while in the case of Figure 1 or 2, when contacts 22 are closed, there is no voltage source to normally drive a current through the current control means 26.

At the time the contact 72 is closed, the commutating reactor 60 will provide a make step and substantially all the voltage of the circuit will appear across the commutating reactor until it saturates. After saturation, the phase current will commutate from the phase including contact 70 to the phase including contact 72 because of the short circuit connected across the transformer secondary winding including both the closed contacts 70 and 72 therein. As the current through contact 70 decreases and goes through zero, the commutating reactor 58 enters its break step.

After contact 72 is closed, it will be noted that reactor 120 no longer has the phase voltage applied thereto, first because of the high impedance of commutating reactor 60, and after saturation of commutating reactor 60, because of the short circuit through contacts 70 and 72. Hence, after closing of contact 72, the reactor 120 generates a voltage which will tend to continue the current flow therethrough in the same direction that it had flowed prior to closure of contact 72.

Therefore, the reactor 120 will operate as a voltage source having a positive potential at the bottom of the reactor and thus will set up a current in the forward direction of the closed circuit including resistor 122 and diodes 112 and 118, as well as in the forward direction of the closed circuit including resistor 122 and diodes 114 and 116. Thus, a forward current is established through each of diodes 112 and 116.

With the commutating reactor 58 now in its break step, the current conducted through the current transformer primary winding and its series connected contact 70 will be measured and generated in the current transformer secondary winding 88 where a positive potential is generated at the bottom of the secondary winding as shown. This will cause a compensating current to be driven around the circuit including current transformer secondary winding 88, contact 70, contact 72 and the parallel paths including diodes 112 and 116 and diodes 118 and 114.

Thus, the compensating current will flow, as indicated by the arrow in Figure 3 and because a pre-existing current has been set up in the pair of diodes 112 and 114, the compensating current will flow in their blocking direction so as to buck down the pre-existing current. Hence, the compensating current flows in a circuit which has a substantially zero impedance. Therefore, the compensating current flowing through contact 70 is substantially equal in magnitude at any instant to the flow of magnetizing current of commutating reactor 58, but is in an opposite direction. As a result, the two currents flowing through contact 70 will cancel one another so that, at the instant contact 70 is opened, it will open under substantially zero current conditions.

Once the contact 70 opens, the flow of current through the by-pass circuit in a reverse direction is limited by the subsequent reversal of current through diodes 112 and 114, at which time the reverse impedance of rectifiers 112 and 114 appear in the by-pass circuit. That is to say, when the flow of current in the compensating circuit becomes larger than the pre-established forward current generated by choke 120 and limited by current limiting resistor 122, then the current must rise against the inverse impedance of diodes 112 and 114 which is substantially large, and the current rise in that direction will be limited to the reverse current of these diodes.

Clearly, when contact 72 of phase B is to be opened after closure of contact 74 of phase C, then the by-pass circuit including current transformer secondary winding 90 and current control means 102 will operate in the manner identical to that set forth above for the operation of the system of phase A. Similarly, current control means 104 will operate when commutating from phase C to phase A, while compensating means 106 operates when commutating from phase A′ to B′, compensating means 108 when commutating from phase B′ to C′, and finally compensating means 110 operates when commutating from phase C′ to phase A′.

Accordingly, the novel compensating means set forth in Figure 3, operates to present a substantially zero impedance to the rise of compensating current in the by-pass circuit during the break step, and after the break step it presents a substantially high impedance to the further rise of current in the by-pass circuit.

The essential improvement presented by my novel system is understood from a realization that the choke 120 need supply forward current through diodes 112 and 114 only during the overlap interval when both of the commutating contacts are closed. This is to be distinguished from the past types of by-pass compensating circuits in which the choke had to supply this forward current for substantially half the cycle. Because of this, the size of the choke, such as choke 120, may be substantially decreased to a point where its size and power requirements are negligible when compared to the other components of the circuit.

Although I have described preferred embodiments of my novel invention, many variations and modifications will now be obvious to those skilled in the art, and I prefer therefore to be limited not by the specific disclosure herein but only by the appended claims.

I claim:

1. In a multiphase contact converter for exchanging energy between a multiphase A.-C. system and a D.-C. system; each phase of said multiphase contact converter including a series connected commutating reactor and contact; each of said contacts being driven into and out of contact engagement in synchronism with the frequency of said A.-C. system to connect and disconnect respectively their respective A.-C. phase to said D.-C. system; a compensation circuit for each rectifier phase comprising a current measuring means; each of said current measuring means being constructed to measure the magnetizing current of its respective commutating reactor passed through its respective contact; each of said current measuring means being connected in series with its said respective contact and the contact of an adjacent phase; each of said current measuring means being further connected to pass the said measured current through said series circuit through its said respective contact in a direction opposite to the flow of magnetizing current therethrough.

2. In a multiphase contact converter for exchanging energy between a multiphase A.-C. system and a D.-C. system; each phase of said multiphase contact converter including a series connected commutating reactor and contact; each of said contacts being driven into and out of contact engagement in synchronism with the frequency of said A.-C. system to connect and disconnect respectively their respective A.-C. phase to said D.-C. system; a compensating circuit for each rectifier phase comprising a current measuring means; each of said current measuring means being constructed to measure the magnetizing current of its respective commutating reactor passed through its respective contact; each of said current measuring means being connected in series with its said respective contact and the contact of an adjacent phase; each of said current measuring means being further connected to pass the said measured current through said series circuit through its said respective contact in a direction opposite to the flow of magnetizing current therethrough; each of said current measuring means comprising a current transformer.

3. In a multiphase contact converter for exchanging energy between a multiphase A.-C. system and a D.-C. system; each phase of said multiphase contact converter including a series connected commutating reactor and contact; each of said contacts being driven into and out of contact engagement in synchronism with the frequency of said A.-C. system to connect and disconnect respectively their respective A.-C. phase to said D.-C. system; a compensation circuit for each rectifier phase comprising a current measuring means; each of said current measuring means being constructed to measure the magnetizing current of its respective commutating reactor passed through its respective contact; each of said current measuring means being connected in series with its said respective contact and the contact of an adjacent phase; each of said current measuring means being further connected to pass the said measured current through said series circuit through its said respective contact in a direction opposite to the flow of magnetizing current therethrough; said compensating current flowing only when both the contact to be compensated and its adjacent contact are closed.

4. In a multiphase contact converter for exchanging energy between a multiphase A.-C. system and a D.-C. system; each phase of said multiphase contact converter including a series connected commutating reactor and contact; each of said contacts being driven into and out of contact engagement in synchronism with the frequency of said A.-C. system to connect and disconnect respectively their respective A.-C. phase to said D.-C. system; a compensating circuit for each rectifier phase comprising a current measuring means; each of said current measuring means being constructed to measure the magnetizing current of its respective commutating reactor passed through its respective contact; each of said current measuring means being connected in series with its said respective contact and the contact of an adjacent phase; each of said current measuring means being further connected to pass the said measured current through said series circuit through its said respective contact in a direction opposite to the flow of magnetizing current therethrough; each of said compensating circuits including a current limiting means having a substantially zero impedance to flow of compensating current below a predetermined magnitude and a substantial impedance to current flow above said predetermined value, said current limiting means including a parallel connected diode and reactor; each reactor of said compensating circuit being energized by the commutating voltage of the phases including adjacent contacts; said reactors being short circuited with respect to their corresponding compensating voltage when the contact to be compensated and its adjacent contact are closed.

5. In a multiphase rectifier circuit including a first and second rectifier phase which commutate; said first and second rectifier phases comprising a respective first and second commutating reactor and a respective first and second contact conected in series with said first and second commutating reactors respectively; each of said first and second contacts being synchronously driven between an engaged and disengaged position; a compensation circuit for said first contact for decreasing the current therethrough during contact disengagement; said compensation circuit comprising a current measuring means for measuring the current flow through said contact prior to opening thereof; said current measuring means being connected in series with said first and second contact to drive a current through said first contact of an identical shape to and in an opposite direction of the measured current flow therethrough when said second contact closes.

6. In a multiphase rectifier circuit including a first and second rectifier phase which commutate; said first and second rectifier phases comprising a respective first and second commutating reactor and a respective first and second contact connected in series with said first and second commutating reactors respectively, each of said first and second contacts being synchronously driven between an engaged and disengaged position; a compensation circuit for said first contact for decreasing the current therethrough during contact disengagement; said compensation circuit comprising a current measuring means for measuring the current flow through said contact prior to opening thereof; said current measuring means being connected in series with said first and second contact to drive a current through said first contact of an identical shape to and in an opposite direction of the measured current flow therethrough when said second contact closes; said current measuring means comprising a current transformer.

7. In a multiphase rectifier circuit including a first and second rectifier phase which commutate; said first and second rectifier phases comprising a respective first and second commutating reactor and a respective first and second contact connected in series with said first and second commutating reactors respectively; each of said first and second contacts being synchronously driven between an engaged and disengaged position; a compensation circuit for said first contact for decreasing the current therethrough during contact disengagement; said compensation circuit comprising a current measuring means for measuring the current flow through said contact prior to opening thereof; said current measuring means being connected in series with said first and second contact to drive a current through said first contact of an identical shape to and in an opposite direction of the measured current flow therethrough when said second contact closes; said compensating circuit further including a series connected current limiting means having a substantially zero impedance to the flow of compensating current below a predetermined magnitude.

8. In a multiphase rectifier circuit including a first and second rectifier phase which commutate; said first and second rectifier phases comprising a respective first and second commutating reactor and a respective first and second contact connected in series with said first and second commutating reactors respectively; each of said first and second contacts being synchronously driven between an engaged and disengaged position; a compensation circuit for said first contact for decreasing the current therethrough during contact disengagement; said compensation circuit comprising a current measuring means for measuring the current flow through said contact prior to opening thereof; said current measuring means being connected in series with said first and second contact to drive a current through said first contact of an identical shape to and in an opposite direction of the measured current flow therethrough when said second contact closes; said compensating current further including a series connected current limiting means having a substantially zero impedance to the flow of compensating current below a predetermined magnitude; said current limiting means including a parallel connected diode and reactor; said diode being connected to block flow of magnetizing current; said reactor being connected in series with the commutating voltage of said first and second rectifier phases and said second contact whereby said reactor generates a forward current through said parallel connected diode when said second contact is closed and said commutating voltage is removed from said reactor.

References Cited in the file of this patent

UNITED STATES PATENTS

| | | |
|---|---|---|
| 2,883,603 | Dortort | Apr. 21, 1959 |
| 2,889,511 | Bedford et al. | June 2, 1959 |

FOREIGN PATENTS

| | | |
|---|---|---|
| 848,217 | Germany | Sept. 1, 1952 |
| 872,598 | Germany | June 18, 1953 |